United States Patent [19]
Yoshida et al.

[11] Patent Number: 5,822,638
[45] Date of Patent: Oct. 13, 1998

[54] CAMERA

[75] Inventors: Hitoshi Yoshida, Hachioji; Hiroshi Akitake, Sagamihara; Takeshi Ito, Hino; Hiroyuki Satake, Musashino; Kazuyuki Iwasa, Hino; Yoshitaka Naitou, Oume; Yu Satoh, Hino, all of Japan

[73] Assignee: Olympus Optical Co., Ltd., Tokyo, Japan

[21] Appl. No.: 801,318

[22] Filed: Feb. 18, 1997

[30] Foreign Application Priority Data

Feb. 20, 1996 [JP] Japan .................................. 8-032252

[51] Int. Cl.$^6$ ........................... G03B 17/02; G03B 17/04; G03B 15/05
[52] U.S. Cl. ........................... 396/448; 396/177; 396/349
[58] Field of Search ..................................... 396/176, 177, 396/178, 349, 448, 348, 281, 287, 289, 290, 291, 292

[56] References Cited

U.S. PATENT DOCUMENTS

| | | | |
|---|---|---|---|
| 3,599,553 | 8/1971 | Hansen et al. | 396/448 |
| 3,680,455 | 8/1972 | Meinunger | 396/348 |
| 4,171,894 | 10/1979 | Yamada | 396/448 |
| 4,363,546 | 12/1982 | Enomoto et al. | 396/448 |
| 4,367,028 | 1/1983 | Tomatsuri et al. | 396/448 |
| 4,557,574 | 12/1985 | Kohno et al. | 396/448 |
| 4,589,747 | 5/1986 | Nakayama et al. | 396/448 |
| 4,601,562 | 7/1986 | Yoneyama et al. | 396/348 |
| 5,253,002 | 10/1993 | Kwak | 396/176 |
| 5,565,942 | 10/1996 | Hagimoto et al. | 396/177 |

FOREIGN PATENT DOCUMENTS

| | | |
|---|---|---|
| 1-255839 | 10/1989 | Japan . |
| 1-288842 | 11/1989 | Japan . |
| 4-55309 | 12/1992 | Japan . |

*Primary Examiner*—A. A. Mathews
*Attorney, Agent, or Firm*—Louis Weinstein

[57] ABSTRACT

An object of a camera of the present invention is to protect mode change switches, a mode display member, or the like from being damaged or prevent it from malfunctioning, and to improve maneuverability. A center part of a camera body 2 shaped like a rectangular parallelepiped is revealed or hidden by a protective cover 5 that can slide freely between the center part of the camera body 2 and a left-hand part thereof. Arranged on the face, top, and back of the center part of the camera body 2 are a photography lens 3, a strobe 6, and mode change switches 16, a mode display member 17, and the like which are used during photography. These members (photography-time used members) are shielded by the protective cover 5 in a closed state and thus protected from being damaged. Moreover, the incident that the members malfunction can be minimized. Only when an open state is set by sliding the protective cover 5 to the left-hand part of the camera body 2 for the purpose of photography, the photography-time used members are exposed to be operational. Thus, excellent maneuverability is ensured.

30 Claims, 13 Drawing Sheets

CAMERA

BACKGROUND OF THE INVENTION

1. Field of the Invention

The present invention relates to a camera, or more particularly, a camera having a protective cover movable to slide between a position at which a photography lens is shielded and a position at which the photography lens is exposed.

2. Description of the Related Art

In the past, various proposals have been made for a camera having a protective cover, which can slide between a position at which the face of a photography lens located on the face of a camera body is shielded and a position at which the face of the photography lens is exposed, in, for example, Japanese Unexamined Patent Publication Nos. 1-255839 and 1-288842, and Japanese Examined Utility Model Publication No. 4-55309. Such a camera has been generally used in practice.

Various proposals have also been made for a camera having a protective cover covering three sides or more of a camera. Among the sides of the camera covered by the protective cover, a side orthogonal to a direction in which film is fed is not covered entirely but part of the side covered by the protective cover is exposed.

A camera having a strobe, which can jut or sink freely, in an area other than a zone within which the protective cover moves to open or close has generally been used for practical purposes in the past.

In the foregoing cameras, when a protective cover is closed, mode change switches, a mode display member, and the like located on the surface of a housing of a camera are exposed. When the camera is carried in a bag or the like, there arises a drawback that the mode change switches, mode display member, and the like exposed to outside may be damaged or may malfunction.

When the protective cover is opened or closed, the housing of the camera may be damaged by pressing areas of the protective cover in which a rail for guiding the movement of the protective cover is not laid. When a lens frame is sunk with the protective cover abutted on the photography lens frame, a load is imposed on the sinking movement.

SUMMARY OF THE INVENTION

An object of the present invention is to provide a camera having a protective cover that covers at least three sides of a camera body, making it possible to reduce the incident that mode change switches, a mode display member, and a housing of the camera are damaged or that an operation switch malfunctions, and offering improved maneuverability.

Briefly, the present invention is characterized by a protective cover movable to slide between a position at which a photography lens is shielded and a position at which the photography lens is exposed, and capable of covering at least three sides of a camera body including the face and back thereof. The face of the protective cover shields the photography lens, and the back thereof covers the back of the camera body by a height reaching the optical axis of the photography lens.

In a camera having a protective cover movable to slide between a position at which a photography lens is shielded and a position at which the photography lens is exposed, included is a flashgun that lies inside a camera body when the protective cover is located at the position at which it shields the photography lens, and that juts through an opening made by the protective cover responsive to the movement of the protective cover when the protective cover is located at the position at which it exposes the photography lens.

In a camera having a protective cover movable to slide between a position at which a photography lens is shielded and a position at which the photography lens is exposed, photography-time usable members to be used highly frequently during photography are located at positions at which the members are shielded by the protective cover when the protective cover is located at the position at which it shields the photography lens, and at which these members are exposed when the protective cover is located at the position at which it exposes the photography lens.

In a camera having a protective cover movable to slide between a position at which a photography lens is shielded and a position at which the photography lens is exposed, included are photography-time unused members which are exposed by the protective cover when the protective cover is located at the position at which it shields the photography lens, and are shielded when the protective cover is located at the position at which it exposes the photography lens, and of which use should be avoided during photography.

Furthermore, in a camera having a protective cover movable to slide between a position at which a photography lens is shielded and a position at which the photography lens is exposed, included is an attachment/detachment mechanism enabling a protective cover to be attached or detached easily for adjustment or repair.

A camera of the present invention has a protective cover capable of covering at least three sides of a camera body and movable to slide between a position at which a photography lens is shielded and a position at which the photography lens is exposed. A rail is laid in areas of the camera body to be pressed when the protective cover is slidably moved by a user's fingers, that is, areas thereof that rub against the protective cover when the protective cover is moved. A finger rest shaped to assist in holding the protective cover with fingers is formed in areas of the protective cover coincident with the areas in which a rail is laid.

Moreover, a strobe juts out through an opening made by the protective cover responsively to the movement of the protective cover from the position at which the photography lens is shielded to the position at which the photography lens is exposed. The jutting strobe hits the protective cover before the protective cover hits a lens frame in the course of moving from the position at which the photography lens is exposed to the position at which the photography lens is shielded, whereby it is prevented that the protective cover hits the lens frame during the sinking movement of the lens frame.

Mode change switches, a mode display member, and the like are arranged in areas of the camera body which are covered by the protective cover when the protective cover lies at the position at which the photography lens is shielded. A rewind switch, battery chamber, and the like are arranged in areas thereof which are exposed by the protective cover.

The above and other objects and advantages of the present invention will become further apparent from the following detailed explanation.

According to the present invention, a protective cover movable to slide between a position at which a photography lens is shielded and a position at which the photography lens is exposed is included for shielding at least three sides of a camera body including the face and back thereof. The face of the protective cover shields the photography lens, and the back thereof covers the back of the camera body by a height reaching the optical axis of the photography lens so as to shield at least photography-time used members to be used during photography.

The photography-time used members such as mode change switches and a mode display member will therefore not be damaged. Moreover, a camera in which the incident that the photography-time used members malfunction when the camera is put in a bag or the like during non-photography can be readily suppressed can be provided.

DETAILED DESCRIPTION OF THE PREFERRED EMBODIMENTS

FIGS. 1 to 19 are diagrams showing the first embodiment of the present invention.

Figure 1:
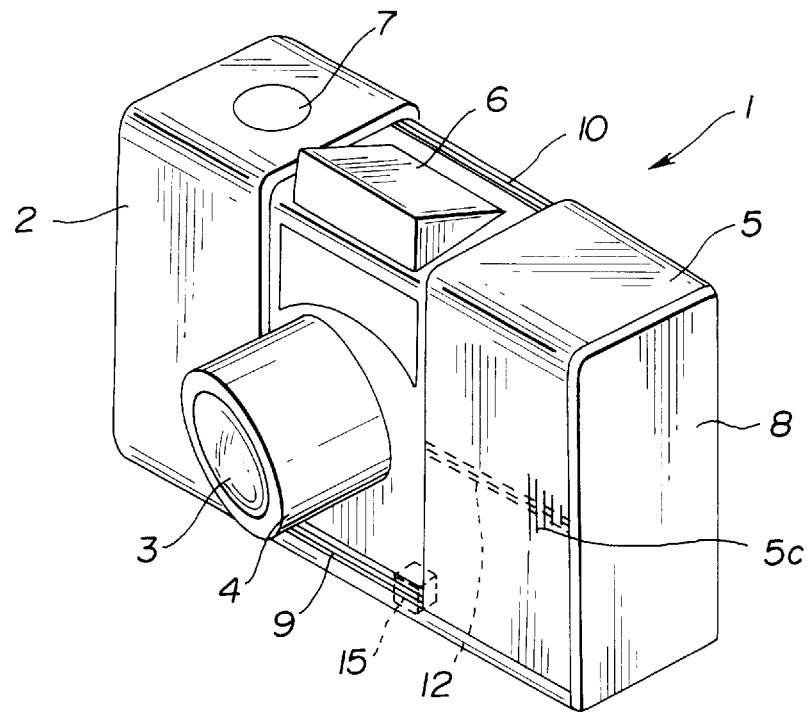
FIG. 1 is an oblique view of the appearance of the front face of a camera of the first embodiment of the present invention in a photographic state.

As shown in FIG. 1, a cylindrical lens frame (lens cylinder) 4 for holding a photography lens 3 for achieving photography is located in the center of the face of a camera body 2 being shaped substantially like a rectangular parallelepiped and forming a camera 1 of the first embodiment of the present invention so that the lens frame 4 can jut or sink freely.

Moreover, a protective cover 5 is placed so that it can cover three sides of the camera body 2; the face, top, and back thereof, and can freely slide between a position at which the photography lens 3 is shielded and a position at which the photography lens 3 is exposed.

To be more specific, the camera body 2 is shaped substantially like a rectangular parallelepiped that is made longer in a lateral direction in order to set a longitudinal axis in the lateral direction. Three sides except the bottom of a center part of the laterally trisected camera body are exposed sides to be covered or exposed by the protective cover 5, or protective cover open sides. The exposed sides are revealed or hidden with the movement of the protective cover 5 having three sides formed by bending a substantially rectangular plate substantially in the form of the letter U (i.e. U-shaped).

Figure 2:
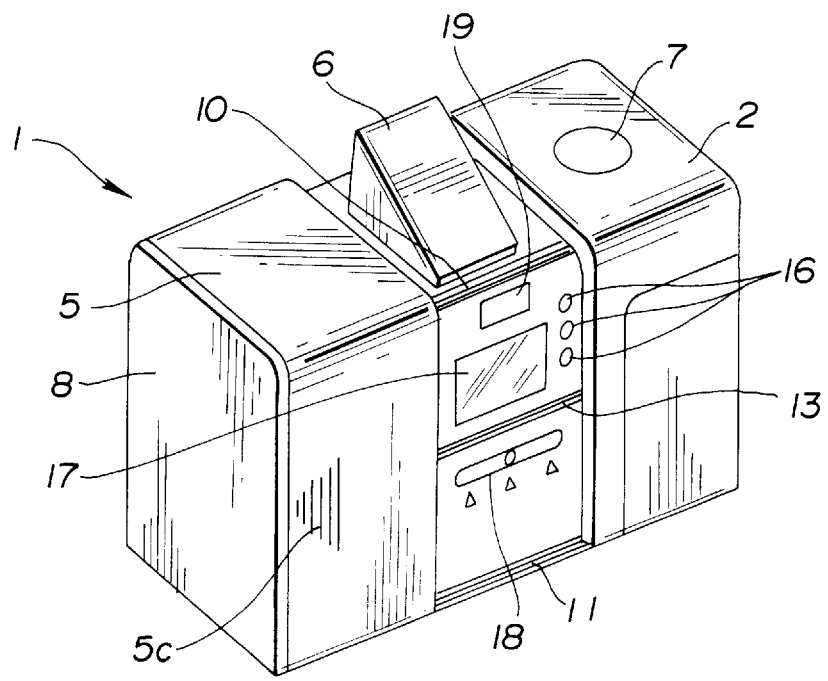
FIG. 2 is an oblique view of the appearance of the back of the camera shown in FIG. 1 in the photographic state.
Figure 3:
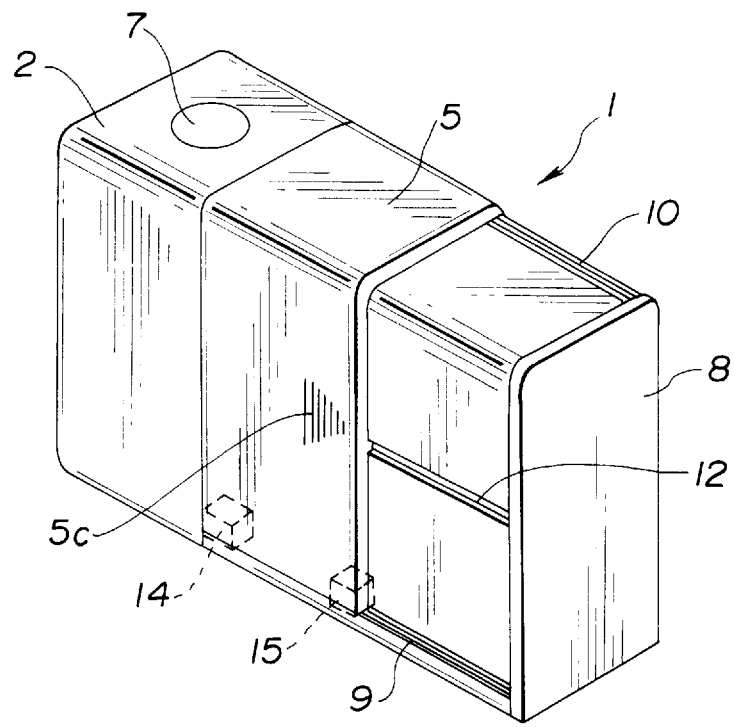
FIG. 3 is an oblique view of the appearance of the face of the camera shown in FIG. 1 in a non-photographic state.
Figure 4:
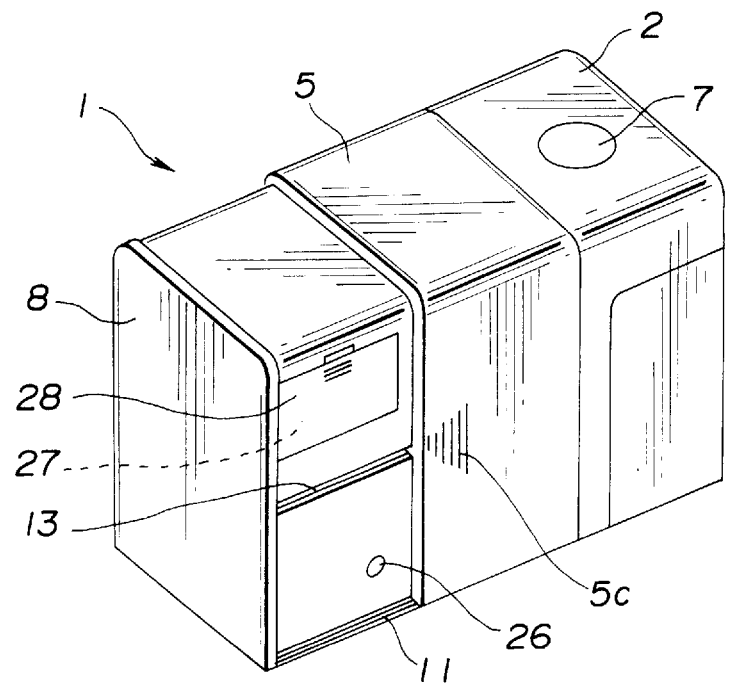
FIG. 4 is an oblique view of the appearance of the back of the camera shown in FIG. 1 in the non-photographic state.

During non-photography during which photography is not carried out, the protective cover 5 is closed to cover the exposed sides as shown in FIGS. 3 and 4. When the protective cover in this state slides leftward until it hits a left-hand side cover 8, an open state in which the exposed sides are exposed is set. A main power supply incorporated in the camera body 2 is turned ON responsive to the maneuver for setting the open state. Furthermore, the fact that the open state is set is sensed by a position sensing means for the protective cover 5, or more particularly, by a protective cover position sensing switch 15 or the like. A jutting movement of the strobe unit 6 and a jutting movement of the lens frame 4 are then carried out as shown in FIGS. 1 and 2. A photographic state in which photography can be performed is thus set.

The expression "left-hand" or the like shall be used with respect to the normal photographic state of the camera 1 (See FIG. 1).

The driving operation for driving a mechanism for stowing the strobe 6 or lens frame 4 is interlocked with the maneuver for moving the protective cover 5 rightward in this state. Moreover, the main power supply can be turned OFF in order to set the non-photographic state shown in FIGS. 3 and 4.

Photography-time used members including mode change switches 16, a mode display member 17, and a picture size change switch 18 which are used rather frequently during photography are arranged on an exposed side, for example, as shown in FIG. 2, on the back of the center part of the camera body 2. The photography-time used members are exposed only during photography, and shielded by the protective cover 5 during non-photography. The photography-time used members are thus protected from being flawed, or prevented from malfunctioning or being set incorrectly.

Moreover, photography-time unused members including a battery chamber 27 and film rewind switch 26 of which use during photography should be avoided are arranged on the back of another part of the camera body on the left-hand side of the center part of the camera body 2, which is covered when the protective cover 5 recedes for photography, for example, a left-hand part shown in FIG. 4. During photography shown in FIG. 2, these photography-time unused members are shielded by the protective cover 5, and thus prevented from being manipulated incorrectly.

Referring to the drawings, the camera of the first embodiment of the present invention will be described more practically.

As shown in FIG. 1, the lens frame 4 located in the center in a height direction and lateral direction of an exposed side of the camera body 2 or the face of the camera body 2 is thrust out by a motor or the like incorporated in the camera body 2 so that the lens frame 4 can jut out of the camera body for photography. For non-photography, the lens frame 4 is sunk into and stowed in a lens frame stowage section inside the camera body 2, and shielded by the protective cover 5 at this time (See FIG. 3).

Located in the center of the top of the camera body 2 that is an exposed side of the camera body 2 is the strobe 6 to be flashed for flash photography during nighttime or as an auxiliary light. During photography during which the protective cover 5 lies at a position at which the photography lens 3 is exposed, as shown in FIG. 1, the strobe 6 juts upward from the top of the camera body 2 and can emit flashlight toward a subject to be photographed.

When the protective cover 5 moves from the position at which the photography lens 3 is exposed to a center position, the protective cover 5 hits the strobe 6 before hitting the lens frame 4. When the lens frame 4 sinks, the lens frame 4 will not be hit and rubbed by the protective cover 5.

In other words, the left-hand edge or the position of the left-hand side of the strobe 6 is located on the left-hand side of the leftmost position of the lateral side of the lens frame 4. When the protective cover 5 is moved rightward in order to change the photographic state to the non-photographic state, the protective cover 5 hits the strobe 6 before hitting at least the lens frame 4 and is locked by the lens frame 4.

Except when the protective cover 5 is moved quickly, in normal use, the protective cover position sensing switch 15 senses the position of the protective cover 5 before the protective cover 5 hits the strobe 6. The strobe 6 is then stowed in a concave part of the top of the camera body 2.

Figure 17:
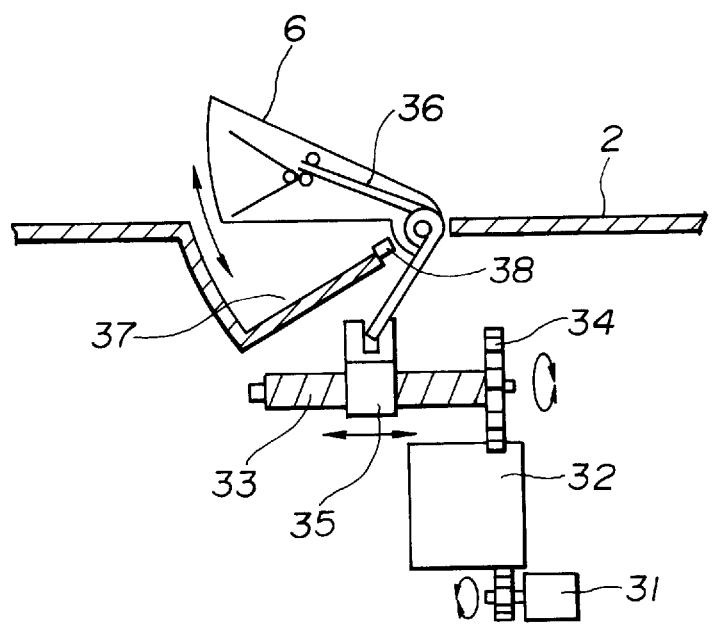
FIG. 17 is an enlarged view of a major portion of the camera shown in FIG. 1, showing a jutting/sinking mechanism for a strobe.

FIG. 17 shows a jutting/sinking mechanism for the strobe 6. A motor 31 serving as a power source for jutting or sinking the strobe 6 is stowed under the top of the center part of the camera body 2. The axis of rotation of the motor 31 is engaged with one end of a power transmission unit 32 including a gear and the like. Consequently, the rotation of the motor 31 is conveyed to the other end of the power transmission unit 32 on the opposite side of the power transmission unit 32.

The other end of the power transmission unit 32 is engaged with a gear 34 fixed to one end of a cam screw 33 having a cam groove. The gear 34 is driven to rotate.

A cam nut 35 is screwed to the cam groove on the cam screw 33 so that the cam nut 35 can move freely along the axis of the cam screw 33. Thus, the rotary motion of the cam screw 33 is converted into a rectilinear motion.

A torsion spring 36 is located near the top of the camera body 2. One end of the torsion spring 36 is connected to the strobe 6, and the other end thereof is held by the cam nut 35 so that the torsion spring 36 can move freely. The strobe 6 is constrained to jut upward from the top by means of the elastic force of the torsion spring 36.

When the photographic state is, as described later, shifted to the non-photographic state with the movement of the protective cover 5, that is, when the exposed sides are covered by the protective cover 5, the protective cover position sensing switch 15 (See FIG. 1) is turned OFF. The turning-OFF movement of the switch 5 causes the motor 31 to rotate. This causes the cam nut 35 to move rightward in FIG. 17. The strobe 6 is stowed in or pushed into a concave part 37 of the top of the camera body 2.

In the concave part 37, a switch 38 formed with a microswitch or the like is placed. The switch 38 is pressed when the strobe 6 is stowed in (pushed into) the concave part 37, and senses the stowed state of the strobe 6 (the later description reads that the switch 38 is turned OFF). A motor that is not shown is driven to start the sinking movement of the lens frame 4, so that the lens frame 4 can be stowed.

In the stowed state of the strobe 6, when the protective cover 5 is moved and set to the photographic state, if the protective cover position sensing switch 15 senses an open state, the switch 15 is turned ON. This causes the motor 31 to rotate, and causes the cam nut 35 to move leftward and thus set to a state in which the strobe 6 juts upward (state shown in FIG. 17). As described later, when the cam nut 35 is set to the state in which the strobe 6 juts upward, the switch 38 is turned ON. The lens frame 4 is then jutted out. This results in the photographic state shown in FIG. 1.

As shown in FIG. 1, a release button 7 is located on the right-hand part of the top of the camera body 2. A side cover 8 is located on the left-hand side of the camera body 2 so that the side cover 8 juts slightly out of the face, top, and back of the camera body 2 (more practically, the side cover 8 juts out by the thickness of the protective cover 5). The side cover 8 is fixed to the camera body 2 by screws or the like (not shown), and can be detached by loosening and removing the screws.

At least one of sliding rails 9, 10, 11, 12, and 13 that are guide members serving as guides along which the protective cover 5 slides and enabling the protective cover 5 to slide smoothly over the sides of the camera body 2 is formed on each of the three sides of the camera body 2.

Specifically, the sliding rail 9 is formed in a horizontal direction near the lower edge of the face of the camera body 2, the sliding rail 10 is formed in a horizontal direction near the back-side edge of the top thereof, the sliding rail 11 is formed in the horizontal direction near the lower edge of the back thereof, the sliding rail 12 is formed in the horizontal direction near the center in height of the left-hand part of the face thereof, and the sliding rail 13 is formed in the horizontal direction near the center in height of the back thereof. A convex area to be engaged with each rail groove is formed at each of coincident positions of the protective cover 5.

With the formation of the sliding rails 12 and 13, it will not take place that for moving the protective cover 5, since the protective cover 5 is pressed, the inside of the protective cover 5 (inner side opposed to the camera body 2) rubs against the face and back of the camera body 2, and the protective cover 5 cannot therefore be moved smoothly. The protective cover 5 can therefore be slided smoothly.

A finger rest 5c that is an irregular area having ditches lengthwise is formed near the left-hand edge of each of the face and back of the protective cover 5 in the center in height of each of the face and back thereof in order to assist in moving the protective cover 5. Owing to the finger rests 5c, the moving maneuver can be carried out readily without a slip.

Moreover, the finger rests 5c are located at positions having the same height as the sliding rails 12 and 13. It can therefore be prevented that a user maneuvers any areas of the protective cover 5 other than those having the same height as the sliding rails 12 and 13 so as to move the protective cover 5.

When the side cover 8 is removed, an attachment/detachment mechanism making it possible to attach or detach the protective cover 5 to or from the camera body 2 is constituted. This simplifies adjustment or the like of the internal components of the camera body 2.

As shown in FIG. 3, a main power supply switch 14 for turning ON or OFF a main power supply and a protective cover position sensing switch 15 for sensing the position of the protective cover 5 are located on the sliding rail 9 formed on the lower edge of the face of the camera body. The protective cover position sensing switch 15 detects the position of the protective cover 5, is used to start jutting the strobe 6 at the time of opening the protective cover 5 or to start stowing the strobe 6 at the time of closing it.

The main power supply switch 14 is, for example, formed with a microswitch that is a mechanical switch. As shown in FIG. 3, in the closed state in which the protective cover 5 is closed to cover the exposed sides, the inside of the protective cover 5 presses a movable contact (of the microswitch) (against a constraining spring for constraining the movable contact to move forward). The main power supply switch 14 is therefore turned OFF. When the protective cover 5 in this state is slightly moved leftward, the movable contact is not pressed by the protective cover 5, but moved by the constraining spring to be turned ON. When the main power supply is turned ON, a main control unit incorporated in the camera body 2 (See FIG. 18 that will be described later) is actuated. Even when the main power supply is OFF, a sub control unit responsible for dating is retained operational all the time.

The protective cover position sensing switch 15 can also be formed with a microswitch or the like. In this case, the protective cover position sensing switch 15 is set so that when the protective cover 5 is moved to a position at which the left-hand edge of the protective cover 5 abuts on the side cover 8 and thus changed from the closed state to the open state, the switch 15 is turned ON because it is freed from the pressure by the inside of the protective cover 5.

The ON state of the protective cover position sensing switch 15 is transmitted to the main control unit. The main control unit sends a driving signal to the motor 31 so as to allow the strobe 6 to jut out. When the strobe 6 is set to the jutted state, the state is sensed by the switch 38. The switch 38 is then turned ON. The ON signal is transmitted to the main control unit. In response to the signal, the main control unit drives a motor for jutting the lens frame 4 and sets the camera to a photography-enabled state shown in FIG. 1.

After photography is completed, when the protective cover 5 is slightly moved rightward in order to set the non-photographic state, the protective cover position sensing switch 15 makes an ON-to-OFF transition. The OFF signal is transmitted to the main control unit. In response to the signal, the main control unit sends a driving signal (for example, a DC driving voltage of opposite polarity) for rotating the motor 31 reversely so as to place the strobe 6 in the stowed state.

In other words, before the right-hand edge of the protective cover 5 hits the left-hand side of the strobe 6, the protective cover position sensing switch 15 senses the movement of the protective cover 5 to the close-state position. When the protective cover 5 moves further rightward, it passes a position coincident with a flank of the strobe 6.

When the strobe 6 is set to the stowed state, the switch 38 senses the stowed state and is turned OFF. The main control unit then gives control so as to stow the lens frame 4.

As shown in FIG. 2, the mode change switches 16 for changing modes are located near the right-hand edge of the back of the center part of the camera body which is exposed by the protective cover 5 during photography. The mode display member 17 is located near the center of the back on the left-hand side of the mode change switches 16, and the picture size change switch 18 for changing picture sizes is located below the mode display member 17. A viewfinder 19 is located above the mode display member 17.

The mode change switches 16 are, for example, a switch for changing modes of photographic states, a switch for changing modes for the strobe unit 6, and a switch for changing modes for dating. Modes specified by these switches are displayed on the mode display member 17 formed with an LCD or the like.

Figure 5:
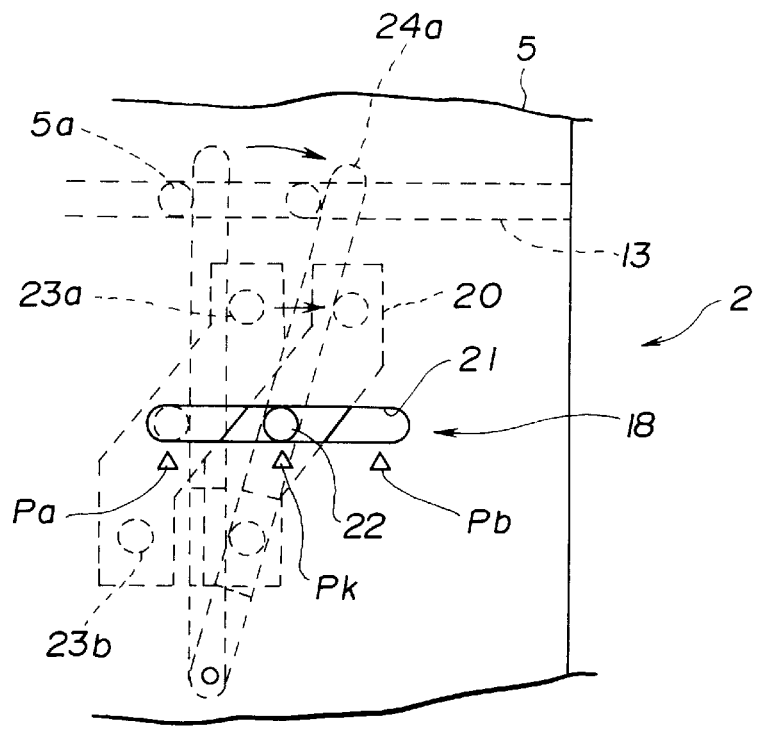
FIG. 5 is an enlarged view of a major portion of the camera shown in FIG. 1, showing the structure of a picture size change switch.
Figure 6:
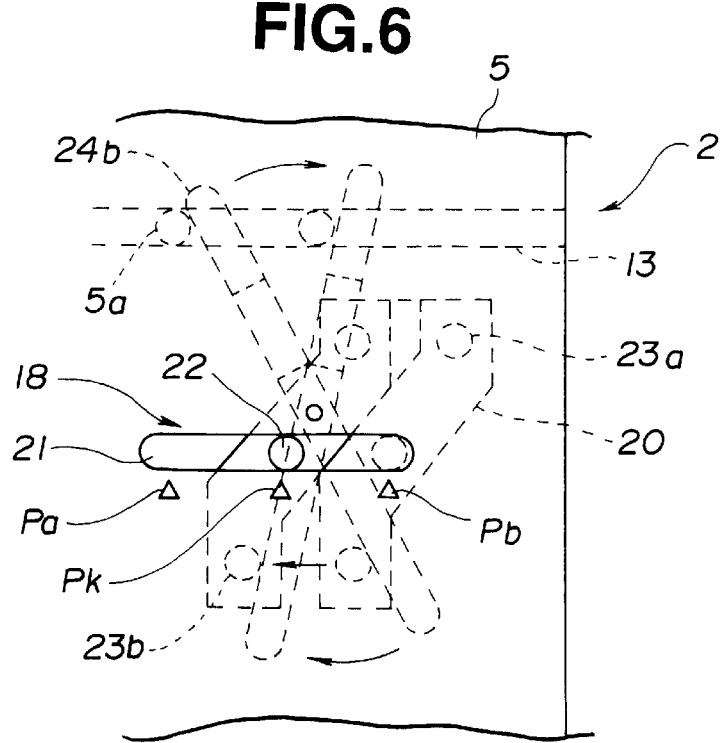
FIG. 6 is an enlarged view of the major portion of the camera shown in FIG. 1, showing the structure of the picture size change switch.

The screen size change switch 18 is a change switch for setting two picture sizes other than a reference picture size. FIG. 5 is an enlarged diagram showing a mechanism adopted for the picture size change switch 18 which is viewed from behind the camera, illustrating the operation of the mechanism exerted when the picture size change switch 18 changes from picture size position Pa to reference picture size position Pk responsive to the movement of the protective cover 5. FIG. 6 illustrates the operation of the mechanism exerted when the picture size change switch 18 changes from a picture size position Pb to the reference picture size position Pk.

A switch body 20 forming the picture size change switch 18 is stowed under the sliding rail 13 formed in the center part of the back of the camera body 2. A pin 22 for setting a picture size position is placed in the center of the switch body 20 so that the pin 22 is exposed within an elongated ditch 21 formed in a horizontal direction on the back of the camera body 2.

Pins 23a and 23b project from upper and lower ends of the switch body 20 on the opposite side of the switch body 20 relative to the pin 22. Moreover, an interlocked member 24a capable of pivoting freely with a lower end thereof as a fulcrum, and an interlocked member 24b capable of pivoting freely with a point near the center thereof as a fulcrum are arranged in the camera body 2 adjacent to the switch body 20.

A press-movement pin 5a is attached to the inside of the back of the protective cover 5 so that the press-movement pin 5a juts inward toward the camera body 2 through the opposed sliding rail 13. For closing the protective cover 5, when the pin 22 of the picture size change switch 18 is located at position Pa or position Pb, the press-movement pin 5a presses the interlocked member 24a or 24b and thus causes the interlocked member 24a or 24b to pivot and to press the pin 23a or 23b of the switch body 22 of the picture size change switch 18 so that the switch body 20 moves from position Pa or position Pb to reference picture size position Pk.

Figure 7:
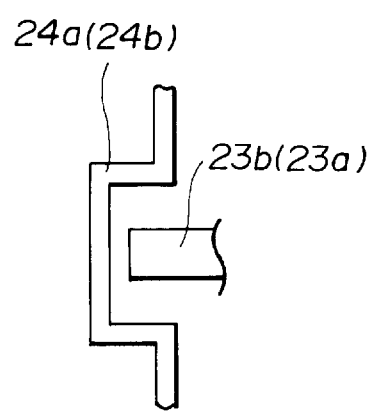
FIG. 7 is an enlarged view of a major portion of the camera, showing interlocked members of the picture size change switch shown in FIGS. 5 and 6.

As shown in FIG. 7, the interlocked member 24a is bent so that it will not hit the pin 23b when pivoting. Likewise, the interlocked member 24b is bent so that it will not hit the pin 23a when pivoting.

As shown in FIG. 4, the film rewind switch 26 for rewinding a film is placed as a photography-time unused member on the back of the left-hand part of the camera body 2 which is not covered by the protective cover 5 during non-photography. The battery chamber 27 for stowing a battery serving as a main power supply is located above the film rewind switch 26. The battery chamber 27 is provided with a battery chamber lid 28.

Next, a control system for the camera 1 of the first embodiment will be described.

Figure 18:
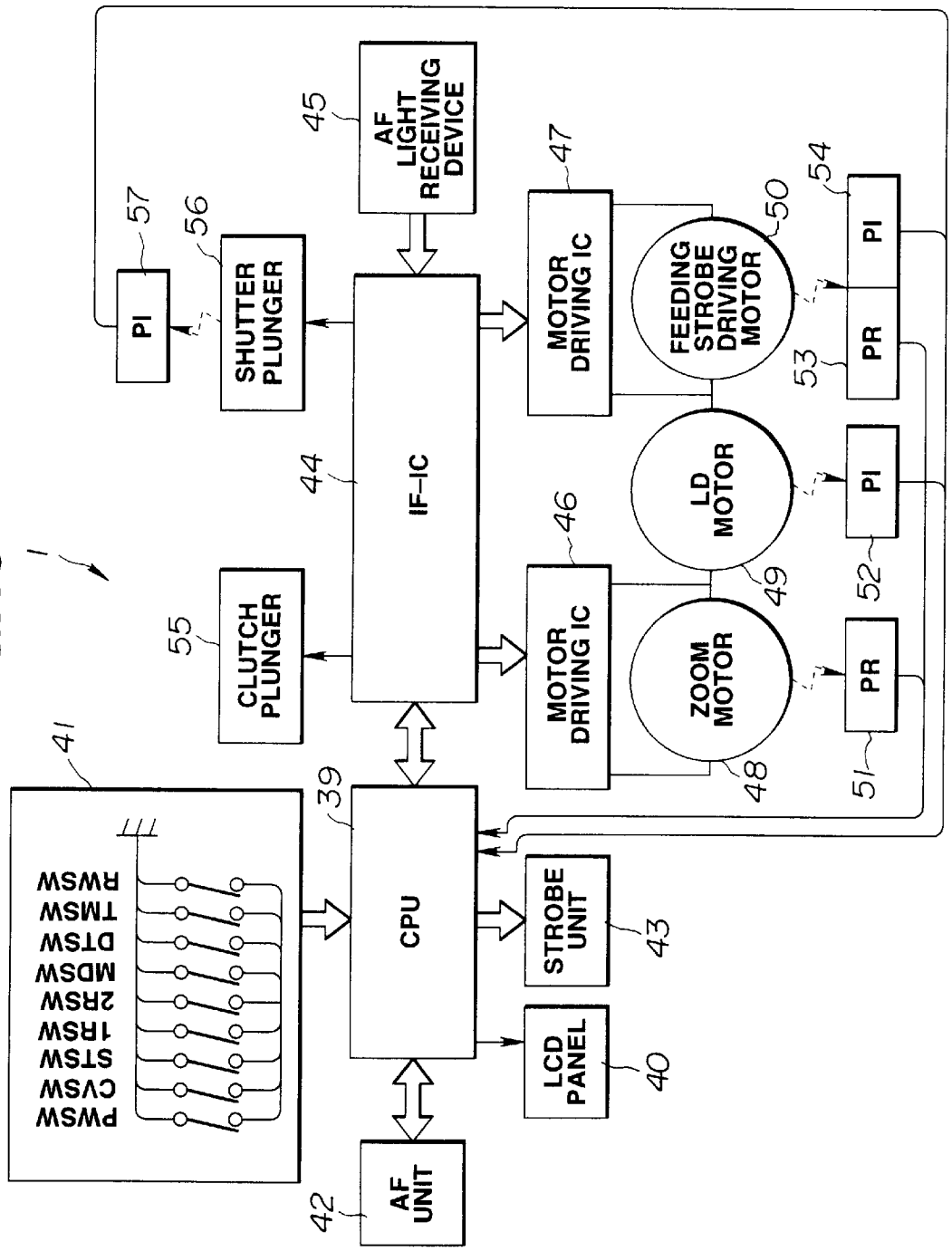
FIG. 18 is a block diagram showing the configuration of a control system provided in the camera shown in FIG. 1.

As shown in the block diagram of FIG. 18 showing the configuration of the control system, the operations of the whole camera, that is, sequence control of camera operations, AF/AE computation, LCD control, switch input control, and the like are controlled by a CPU 39 serving as a main control unit and being comprised of a microcomputer.

Connected to the CPU 39 are an LCD panel 40 equivalent to the mode display member 17, a switch unit 41 composed of a plurality of switches associated with various maneuvers, an AF unit 42 responsible for automatic focus, a strobe unit 43 including the strobe 6, an interface IC (IF-IC) 44, and the like.

The switch unit 41 is composed of various switches described below.

PWSW: a power switch associated with the main power supply switch 14

CVSW: a cover switch associated with the protective cover position sensing switch 15

STSW: strobe switch associated with the switch 38

1RSW: a first release switch that makes when the release button 7 is pressed midway (for first release) and is used for AF lock or AE lock 2RSW: a second release switch that makes when the release button 7 is pressed fully (for second release) and starts photography movements (exposure movements)

MDSW: a photography mode switch associated with one of the mode change switches 16 and used to select any of photographic-state modes DTSW: a date switch associated with one of the mode change switches 16 and used to select any of date modes TMSW: a switch associated with one of the mode change switches 16 and used to select any of strobe modes RWSW: a rewind switch associated with the film rewind switch 26

The AF unit 42 carries out distance measurement. Resultant distance measurement data is transferred to the CPU 39 over a serial data bus.

The strobe unit 43 is charged in response to a charge signal sent from the CPU 39, and sends a charging voltage to the CPU 39 so that it is checked whether or not charging is completed.

The interface IC 44 is connected to the CPU 39 over the serial data bus, and is an IC having a circuit for carrying out photometry on receipt of a photoelectric current from an AE light-receiving device 45 connected to the interface IC 44, and a motor drive circuit for driving the motor driving ICs 46 and 47.

A motor driving signal is supplied from the interface IC 44 to the motor driving ICs 46 and 47 connected to the interface IC 44. With the motor driving signal, any of a zoom motor 48, LD motor 49, and feeding/strobe driving motor 50 is selected and driven.

The zoom motor 48 receives a signal from a zoom encoder formed with a photoreflector (PR) 51 and is controlled by the CPU 39. The feeding/strobe driving motor 50 is controlled with signals sent from a photoreflector (PR) 53 and photointerrupter (PI) 54 which are incorporated in a film feeding unit in the camera body 2, or a strobe driving signal sent from the CPU 39.

A driving force for the feeding/strobe driving motor 50 is changed from a driving force for use in film feed movements, that is, in film sending-out, film wind, and film rewind movements to a driving force for use in driving the strobe or vice versa by means of a clutch plunger 55. A shutter plunger 56 receives a signal from a photointerrupter (PI) 57 and is controlled by the CPU 39.

The LD motor 49 is a motor for driving and focusing the lens within the lens frame 4, and is controlled with a signal sent from a photointerrupter (PI) 52.

The operation of the camera of the first embodiment having the foregoing components will be described below.

Herein, a series of movements to be made to change the state of the camera 1 from the non-photographic state shown in FIGS. 3 and 4 to the photographic state shown in FIGS. 1 and 2 and then back to the non-photographic state will be described in conjunction with FIGS. 8 to 16.

To begin with, movements to be made for changing from the non-photographic state of the camera 1 to the photographic state and carrying out photography will be described briefly.

The protective cover 5 can move to a position at which the photography lens 3 is exposed. First, the finger rests 5c are pressed in order to move the protective cover 5 along the rails. At this time, the protective cover 5 slides along the rails until it hits the side cover 8 placed on a flank of the camera body. The side cover 8 prevents the protective cover 5 from coming off the main body 2.

With the sliding movement of the protective cover 5, the main power supply is turned ON by the main power supply switch 14. When the protective cover 5 is opened, the protective cover position sensing switch 15 is turned ON. In this open state, the photography-time unused members including the film rewind switch 26 and battery chamber 27 which have not been shielded (have been exposed) by the protective cover 5 are shielded by the protective cover 5, while the photography-time used members including the mode change switches 16, mode display member 17, and picture size change switch 18 which have been shielded by the protective cover 5 in the closed state are exposed.

When the protective cover 5 is moved, the protective cover position sensing switch 15 is turned ON. This causes the strobe 6 to jut out. The switch 38 senses that the strobe 6 has jutted out. The lens frame 4 for the photography lens 3 is thrust out. This results in the photographic state in which photography is enabled.

When the lens frame 4 is thrust out, as described in conjunction with FIG. 17, the driving force of the motor 31 is conveyed to the cam screw 33 by the power transmission unit 32. This causes the cam screw 33 to rotate. The cam nut 35 makes a rectilinear motion in the direction of the axis of the cam screw 33 owing to the cam groove formed on the can screw 33. This causes the torsion spring 36 to pivot in a direction in which the strobe 6 is jutted out of the camera body 2. Consequently, the strobe 6 juts out of the camera body 2.

Next, a photographer maneuvers the picture size change switch 18, changes picture sizes to select a desired picture size, selects a photographic state, a mode for the strobe 6, and a date, and then checks set modes through the mode display member 17. The photographer then maneuvers the release button 7 to carry out photography.

Figure 8:
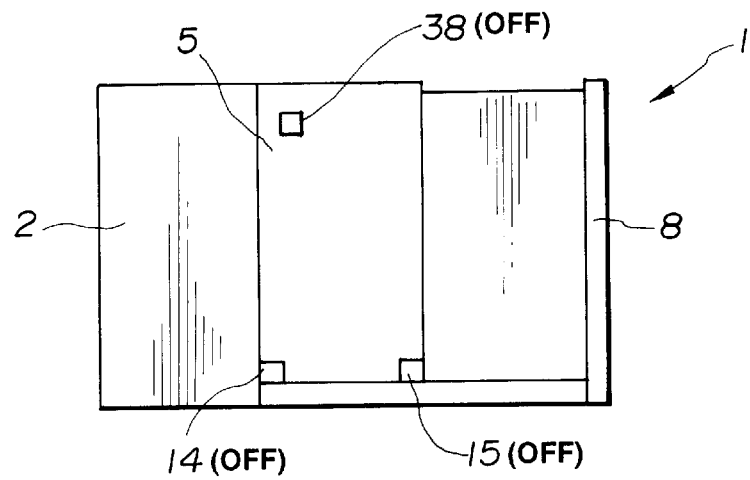
FIGS. 8 to 16 are front views of the camera serving as explanatory diagrams of movements, showing the states (ON or OFF states) of switches relative to positions of a protective cover of the camera shown in FIG. 1.

To be more specific, first, when the protective cover 5 is closed, the switch 38, main power supply switch 14, and protective cover position sensing switch 15 are OFF (state shown in FIG. 8).

Figure 9:
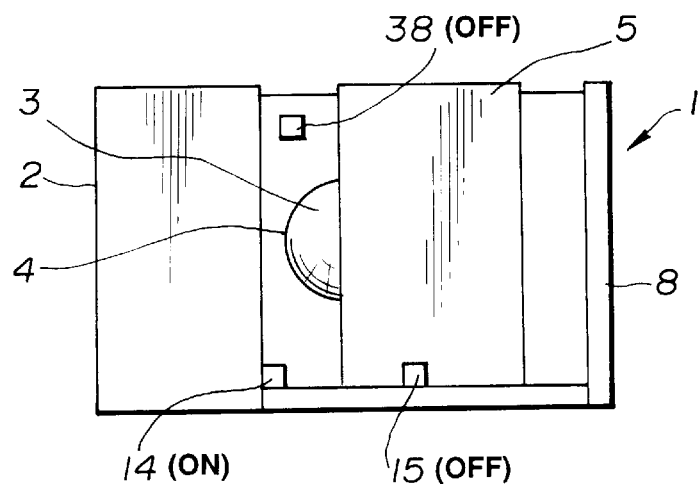
Figure 10:
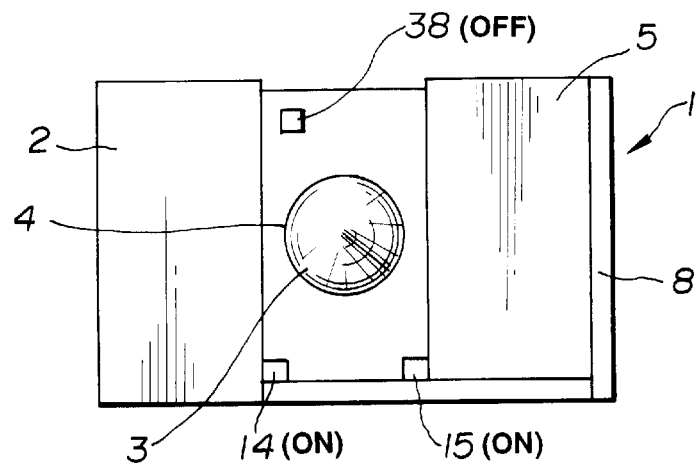
Figure 11:
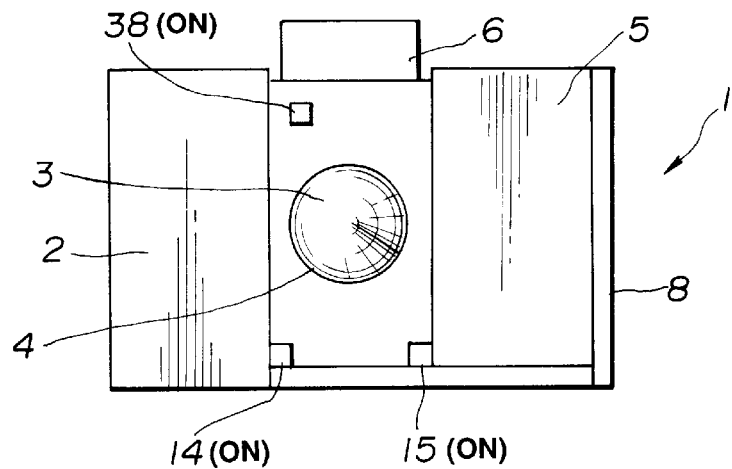

When the protective cover 5 is opened, the main power supply switch 14 is turned ON with a little movement of the protective cover 5 (state shown in FIG. 9). The protective cover position sensing switch 15 is turned ON when the protective cover 5 comes to a position at which the protective cover hits the side cover 8 (state shown in FIG. 10).

When both the main power supply switch 14 and protective cover position sensing switch 14 are ON, the strobe 6 juts out under the control of the main control unit. The switch 38 is then turned ON (state shown in FIG. 11).

Figure 12:
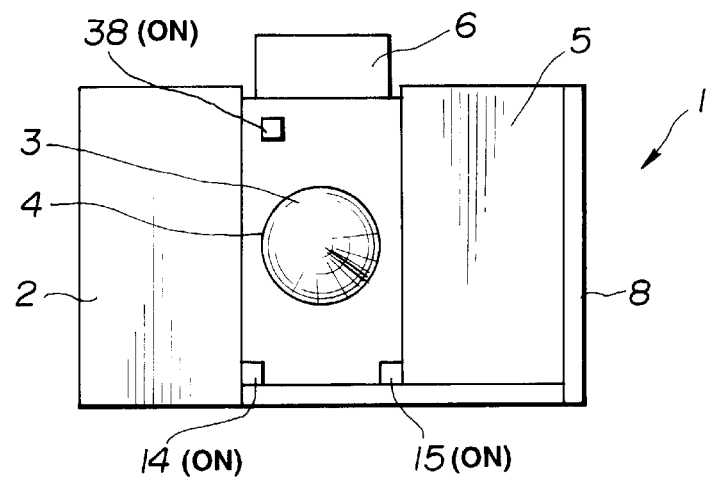

When the three switches are ON, the lens frame 4 is thrust out (state shown in FIG. 12).

Figure 14:
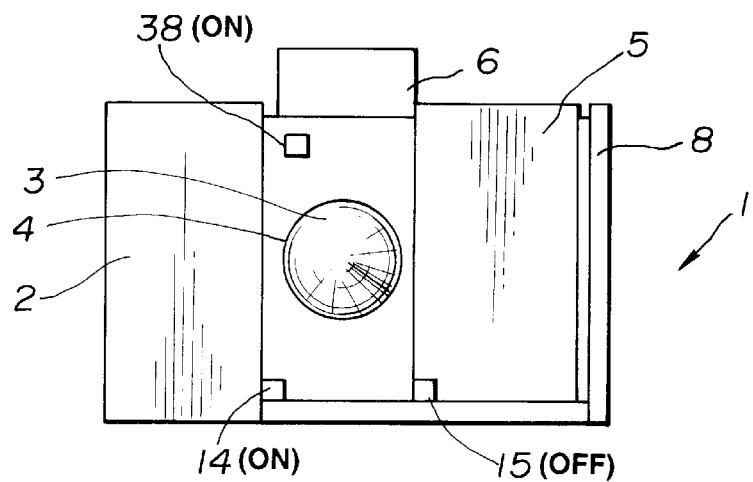

After photography is completed, the protective cover 5 is moved to a position at which the protective cover position sensing switch 15 is turned OFF (state shown in FIG. 14). In this state, the protective cover 5 is temporarily halted by a click stop mechanism. When the protective cover 5 is moved too much, the protective cover 5 hits the jutting strobe 6 before hitting the outer circumference of the jutting lens frame 4, and is restrained from sliding farther.

Figure 15:
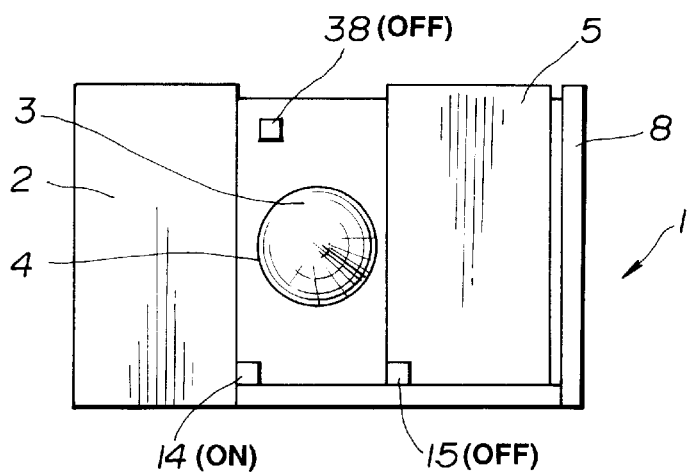
Figure 16:
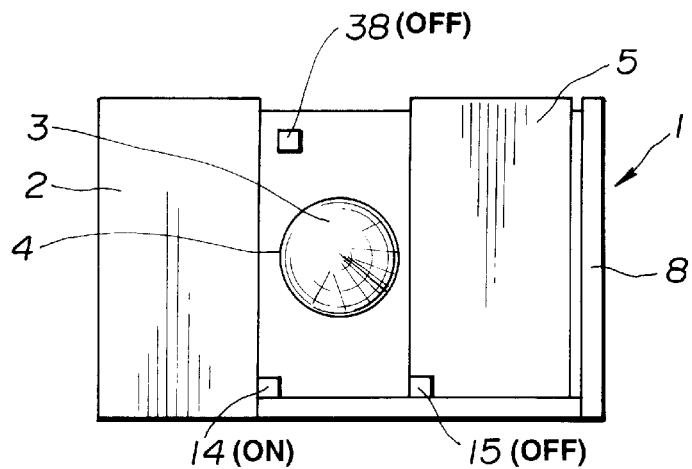

The strobe 6 is, as described in conjunction with FIG. 17, stowed in the camera body 2 because the cam screw 33 and cam nut 35 move in a direction opposite to a direction in which they move to jut the strobe 6 out (state shown in FIG. 15). The switch 38 is then turned OFF, and the lens frame 4 is sunk (state shown in FIG. 16).

At this time, the protective cover position sensing switch 15 is checked to see if the protective cover 5 is located at a position at which the protective cover 5 is closed (the OFF state of the protective cover position sensing switch 1). The switch 38 is checked to see if the strobe 6 is stowed (the OFF state of the switch 38). Sinking the lens frame 4 is then started.

When the lens frame 4 and strobe 6 are sunk and stowed respectively, the protective cover 5 can be closed.

When the state (non-photographic state) shown in FIG. 8 is set, the main power supply is turned OFF.

Figure 13:
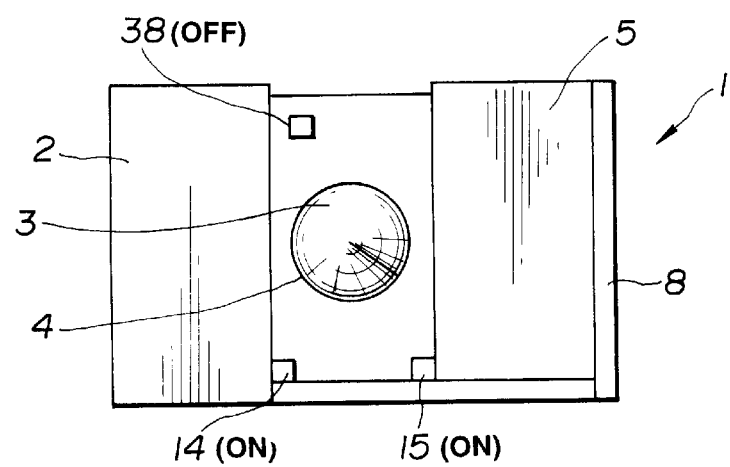

When the strobe 6 is pushed into the camera body 2 for photography, the state shown in FIG. 13 is set. In this case, even when the switch 38 is turned OFF, since the protective cover position sensing switch 15 is ON, sinking the lens frame 4 is not started.

When the protective cover 5 is moved in a closing direction, the picture size change switch 18 is reset to reference picture size position Pk. For example, as shown in FIG. 5, when the pin 22 of the picture size change switch 18 is located at position Pa, the press-movement pin 5a presses the interlocked member 24a and thus causes the interlocked member 24a to pivot. The interlocked member 24a in turn presses and moves the pin 23a. When the protective cover 5 is closed, the pin 22 of the picture size change switch 18 moves to reference picture size position Pk.

As shown in FIG. 6, assuming that the pin 22 of the picture size change switch 18 is located at position Pb, when the protective cover 5 is moved in the closing direction, the press movement pin 5a presses the interlocked member 24b and thus causes the interlocked member 24b to pivot. The interlocked member 24b in turn presses and moves the pin 23b. This causes the pin 22 to move to reference picture size position Pk.

In this state, that is, in the non-photographic state, the battery chamber 27 and film rewind switch 26 are exposed. When the lid 28 of the battery chamber 27 is opened backward of the camera, the battery can be replaced with a new one from behind the camera. Moreover, film rewind can be carried out by maneuvering the film rewind switch 26.

For adjustment or repair in the cause of manufacturing a camera, the side cover 8 is unscrewed and removed from the camera body 2. The protective cover 5 can now be readily attached or detached. Now, adjustment or the like of the components in the camera body 2 can be carried out readily.

Figure 19:
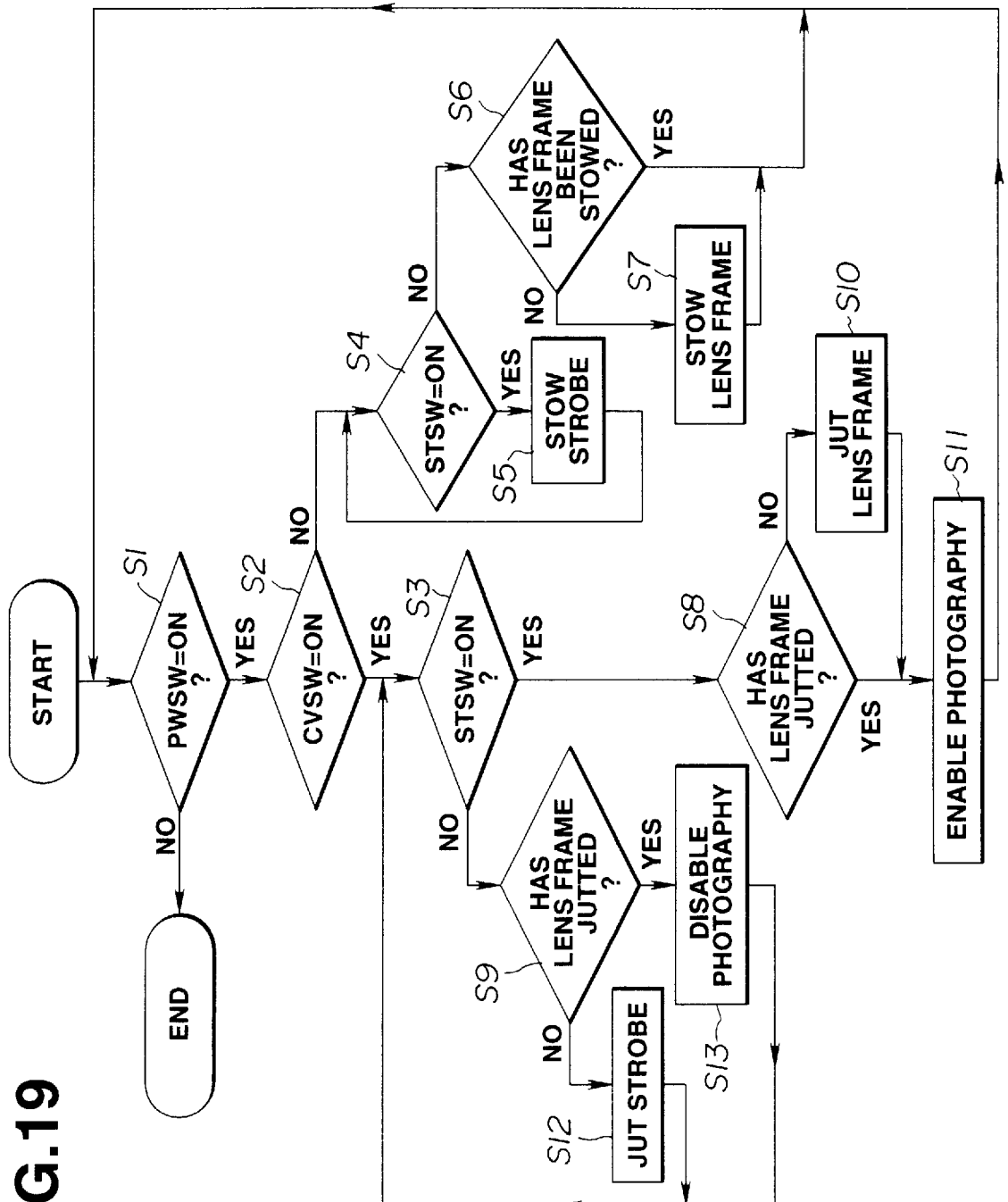
FIG. 19 is a flowchart describing the flow of operations of the camera shown in FIG. 1.

Next, movements to be made for setting the photography-enabled state by turning ON the main power supply in a state in which film is loaded in the camera 1 will be described in conjunction with the flowchart of FIG. 19.

Herein, a state in which film is loaded in the camera 1, and the protective cover 5 is located at a position at which the photography lens 3 is shielded shall be regarded as an initial state.

In the initial state, at step S1, it is checked if the protective cover 5 has been moved and the main power supply switch (PWSW) 14 is turned ON. If it is judged that the switch PWSW 14 is ON (PWSW=ON), the protective cover 5 opens. Therefore, when the switch PWSW is turned ON, control is passed to step S2.

At step S2, it is checked if the protective cover 5 is further moved to be completely closed and the protective cover position sensing switch 15 (CVSW) is turned ON. If it is judged that the switch CVSW 15 is ON (CVSW=ON), control is passed to step S3. If the switch CVSW 15 is OFF, control is passed to step S4.

If it is judged at step 52 that the switch CVSW is OFF, control is passed to step S4. At step S4, the jutted or sunk state of the strobe 6 is sensed. Incidentally, the jutted or sunk state of the strobe 6 is sensed by checking the ON or OFF state of the switch 38.

Specifically, when the strobe 6 is jutted out, the switch (STSW) 38 is ON (STSW=ON). At step S5, the strobe 6 is stowed in the camera body 2. Control is then returned to step S4.

If it is found at step S4 that the strobe 6 has sunk (stowed state), the switch STSW 38 is turned OFF. At step S6, the state of the lens frame 4 is sensed. If the lens frame 4 is not stowed, control is passed to step S7. At step S7, the lens frame 4 is stowed. Control is then returned to step S1. The subsequent processing is repeated.

If it is judged at step S2 that the switch CVSW 38 is ON, control is passed to step S3. Even in this case, at step S3, the jutted or sunk state of the strobe 6 is sensed. If the strobe is jutted out, the switch STSW 38 is ON (STSW=ON). Control is therefore passed to step S8. At step S8, the state of the lens frame 4 is sensed.

If the strobe 6 is sunk (stowed), the switch STSW 38 is OFF. Control is then passed to step S9. At step S9, like at step S8, the state of the lens frame 4 is sensed.

If it is judged at step S8 that the lens frame 4 is not jutted out, the lens frame 4 is thrust out and thus jutted out at step S10. Control is then passed to step S11. The camera enters the photography-enabled state (step S11). Control is then returned to step S1, and the subsequent processing is repeated.

If it is judged at step S8 that the lens frame 4 is jutted out, control is passed to step S11 immediately. The camera 1 is brought to the photography-enabled state (step S11). Control is then returned to step S1, and the subsequent processing is repeated.

If it is judged at step S9 that the lens frame 4 is not jutted out, the strobe 6 is jutted out at step S12. Control is then returned to step S3, and the subsequent processing is repeated.

If it is judged at step S9 that the lens frame 4 is jutted out, it is judged at step S13 that the camera 1 is in the photography-disabled state. Control is then returned to step S3, and the subsequent processing is repeated in the same manner.

As mentioned above, when the camera 1 is in the photography-enabled state, control is returned to step S1 without fail. When the protective cover 5 is closed and the switch PWSW 14 is turned OFF, the non-photographic state is set. The operation of the camera 1 is therefore completed.

As described previously, the camera of the first embodiment provides the advantage described below.

During non-photography, the exposed sides of the center part of the camera body 2 are covered by the protective cover 5. The outer surfaces of the exposed sides, and the mode change switches 16, mode display member 17, and the like arranged on the exposed sides will therefore not be damaged. The appearance of the camera will not be impaired for a prolonged period of time. When the camera is put in a bag or the like, the incident that, for example, the settings of the mode change switches 16 are changed to malfunction can be minimized easily.

During photography, when the protective cover 5 is closed swiftly with the strobe 6 jutted out, the protective cover 5 hits the strobe 6 before hitting the lens frame 4 for the photography lens 3. It can therefore be prevented that the lens frame 4 rubs against the protective cover 5 when sinking. A load imposed during the sinking can therefore be lightened, and the appearance of the camera can be protected from being impaired.

When the protective cover 5 is closed, if the picture size change switch 18 is pressed to move to the reference position, the next photography can be carried out at a highly frequently-adopted reference picture size without the necessity of changing the position of the switch 18.

Since the film rewind switch 26 is hidden behind the protective cover 5 during photography, it can be prevented that rewind is carried out by mistake during photography.

When a battery is replaced with a new one with the main power supply ON, there arises a fear that a malfunction may occur or recorded data may be lost. However, since battery replacement is enabled only when the main power supply is OFF, the drawbacks of the malfunction and data loss can be resolved.

Moreover, since the protective cover 5 can be attached or detached readily by removing the side cover 8, repair, adjustment, or the like can be carried out smoothly. This contributes to improvement of maintenance efficiency.

Thus, according to the first embodiment, the camera 1 enabling easy prevention of a damage and malfunction and offering excellent maneuverability can be provided.

In the first embodiment, the protective cover 5 for covering three sides of the camera body 2 is employed. Alternatively, the protective cover 5 may cover only one side thereof. In this case, it is required that the strobe 6, mode change switches 16, mode display member 17, and the like are arranged on the one side of the camera body 2 to be covered by the protective cover 5.

If the protective cover 5 is structured to cover two sides or more of a camera, freedom in arranging the strobe 6, mode change switches 16, mode display member 17, and the like would expand greatly. The protective cover 5 covering two sides or more of a camera therefore belongs to the present invention.

An exemplary protective cover for covering two sides of a camera includes, for example, the protective cover 5 having two sides, that is, the face for shielding a photography lens and the top for shielding the strobe 6, mode change switches 16, mode display member 17, and the like.

When a mode change-related function is included, or in other words, when the mode change switches 16, mode display member 17, and the like are arranged on the top (or flank) of a camera, there may arise a drawback that the switch or member may be hidden behind fingers or cannot be maneuvered smoothly. In this case, the protective cover 5 is designed to cover at least three sides of a camera body including the face and back thereof (for example, the face, top, and back). The back of the protective cover covers the back of the camera body by a height reaching the optical axis of the photography lens 3. The photography-time used members such as the mode change switches 16 and mode display member 17 are arranged near the center of the back of the camera body which is easily maneuverable. Thus, good maneuverability can be ensured. The photography-time used members can be shielded by the protective cover 5 during non-photography.

In the first embodiment, the strobe 6 is designed to jut or sink automatically responsively to the maneuver for opening or closing the protective cover 5. Alternatively, the jutting or sinking movement of the strobe 6 may be achieved by hand (manually).

Furthermore, in the first embodiment, the strobe 6 is designed to jut out when the protective cover 5 is opened. A member to be jutted out is not limited to the strobe. For example, part of a viewfinder optical system such as an eyepiece lens or objective lens may be designed to jut out. Moreover, when the camera 1 is a single-lens reflex camera, a pentagonal roof prism or viewfinder eyepiece lens that is part of a viewfinder optical system may be designed to jut out.

A camera constructed by extracting part of the features of the first embodiment also belongs to the present invention.

Next, a camera of the second embodiment of the present invention will be described briefly.

The camera of the second embodiment has basically the same components as the camera of the first embodiment. However, the main power supply switch 14 and protective cover position sensing switch 15 included in the camera 1 of the first embodiment are excluded, while a switch 61 for sensing the jutted or sunk state of a strobe 63 is newly included. Moreover, the mechanism for jutting or sinking the strobe 63 is a bit different from the corresponding one of the camera 1.

Figure 28:
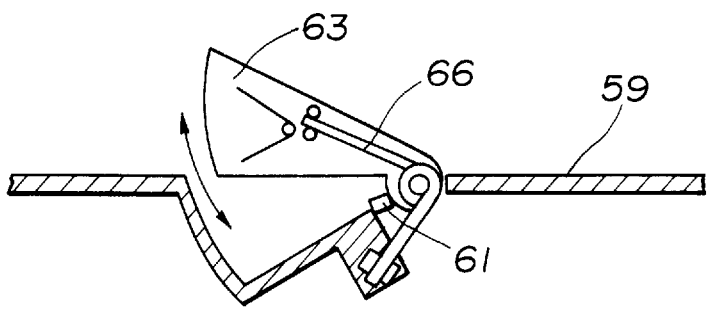
FIG. 28 is an enlarged view of a major portion of the camera of the second embodiment of the present invention, showing a jutting/sinking mechanism for a strobe.

The jutting/sinking mechanism for the strobe 63 in the camera of the second embodiment has the structure shown in FIG. 28. That is to say, a torsion spring 66 having one end thereof locked in a camera body 59 and the other end thereof locked in the strobe 63 is included. The strobe 63 is constrained to move in a direction in which the strobe juts out of the camera body 59 due to the constraining force of the torsion spring 66. When the protective cover 60 (See FIG. 20) is open, the jutting movement of the strobe 63 is stopped by the protective cover 60.

To be more specific, the protective cover 60 presses the strobe 63 from above against the constraining force of the torsion spring 66. At this time, the strobe 63 is stowed in a concave part of the top of the camera body 59. When the protective cover 60 is opened, the strobe 63 is jutted out through an opening due to the constraining force of the torsion spring 66.

When the strobe 63 is stowed in the camera body 59, the switch 61 is turned OFF. When the strobe 63 juts out, the switch 61 is turned ON.

When the protective cover 60 is opened, the strobe 63 juts out and the switch 61 is turned ON. The main power supply is then turned ON and a lens frame 65 is thrust out, while the strobe 63 is stowed in the camera body 59. When the switch 61 is turned OFF, the lens frame 65 sinks and the main power supply is turned OFF.

The operation of the camera of the second embodiment having the foregoing components will be described in conjunction with FIGS. 20 to 27.

When the protective cover 60 is closed, the strobe 63 is stowed in the camera body 59. The switch 61 is therefore OFF (state shown in FIG. 20).

Figure 21:
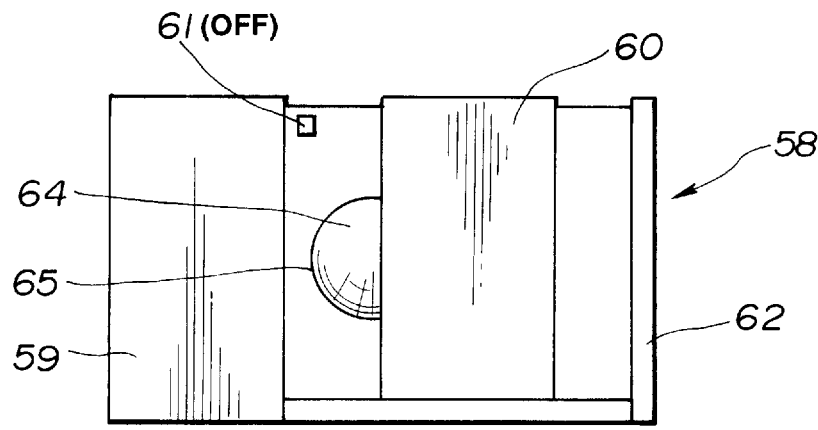
Figure 22:
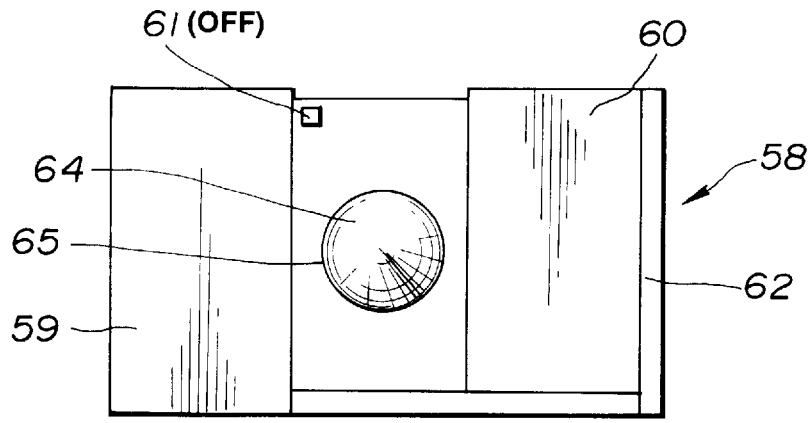
Figure 23:
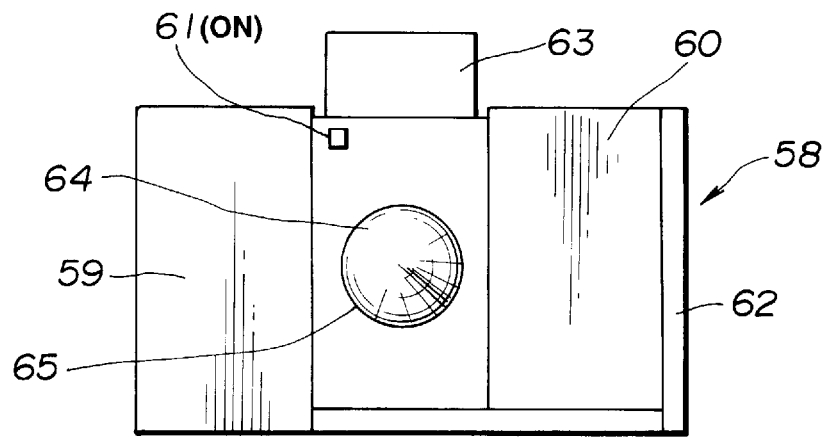
Figure 24:
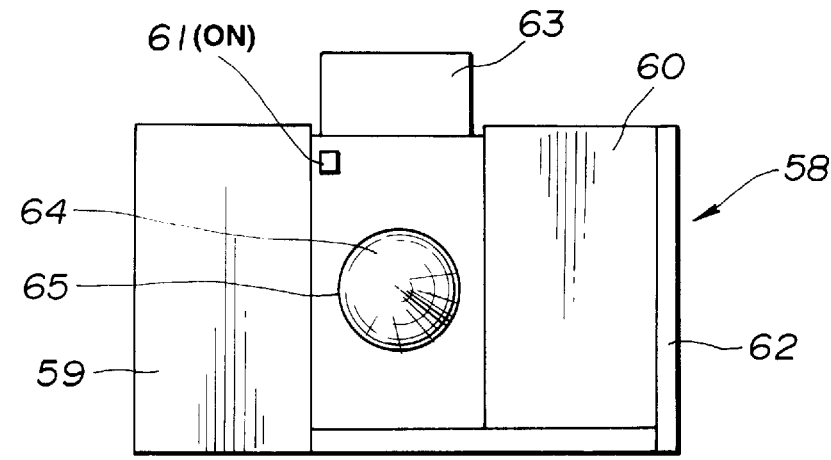

In this state, the protective cover 60 is, as shown in FIG. 21, started opening. When the protective cover 60 has been, as shown in FIG. 22, opened fully, that is, has been slided to a position at which the protective cover 60 is locked by the side cover 62, the strobe 63 stowed in the camera body 59 is, as shown in FIG. 23, jutted out due to the constraining force of the torsion spring 66. When the strobe 63 juts out, the switch 61 is turned ON. The main power supply is turned ON accordingly. The lens frame 65 is then thrust out. This brings the camera 58 to the photography-enabled state (state shown in FIG. 24).

Figure 25:
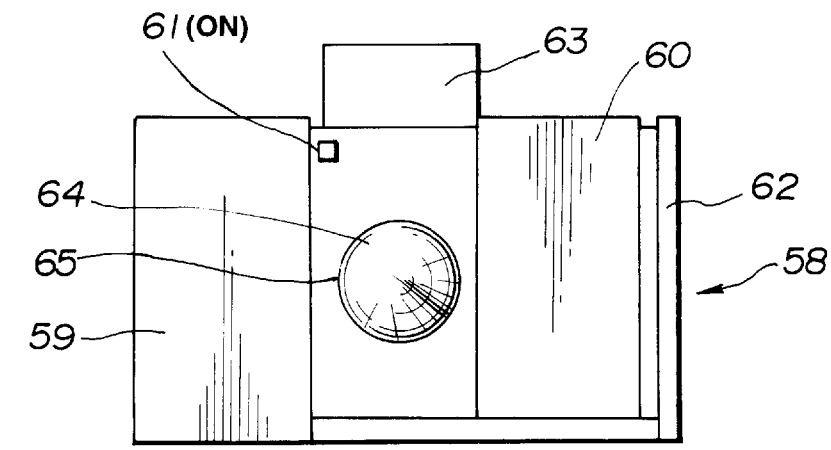
Figure 26:
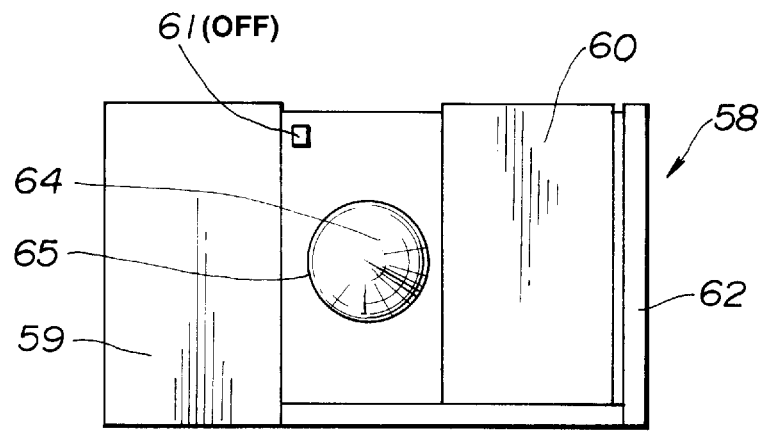
Figure 27:
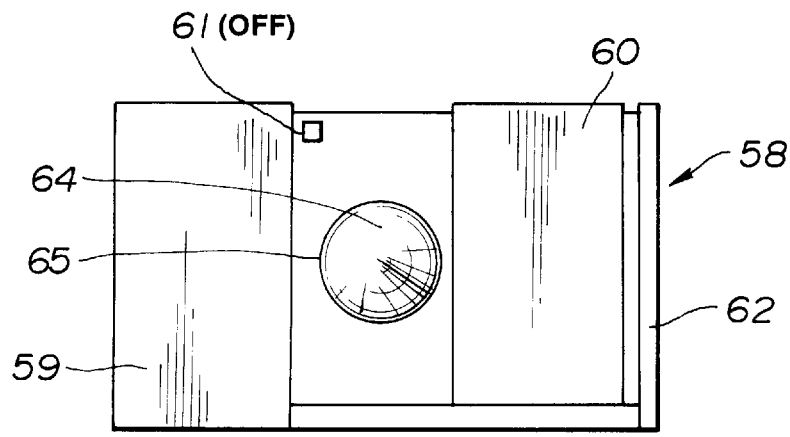

After photography is completed, when the protective cover 60 is moved in a close direction, the protective cover 60 hits the strobe 63 before hitting the lens frame 65 (state shown in FIG. 25). In this state or the state shown in FIG. 24, the strobe 63 is manually pushed into the camera body 59 against the constraining force of the torsion spring 66. When the stowed state is thus set, the switch 61 is turned OFF (state shown in FIG. 26). After the lens frame 65 is stowed in the camera body 59, the main power supply is turned OFF (state shown in FIG. 27).

Figure 20:
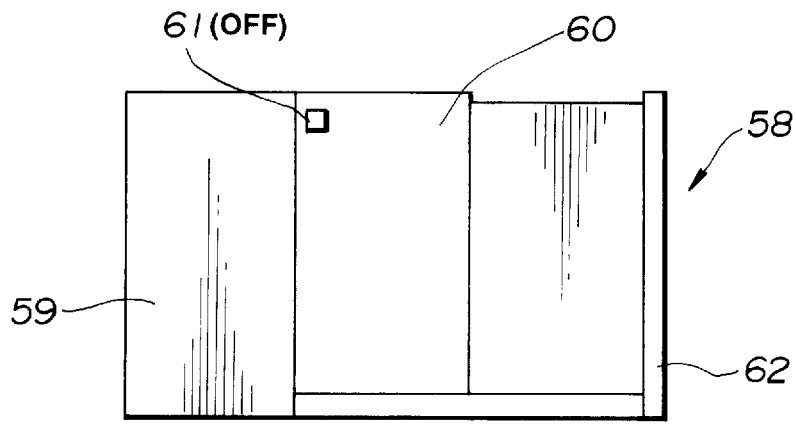
FIGS. 20 to 27 are front views of the camera serving as explanatory diagrams of movements showing states (ON or OFF states) of switches relative to positions of a protective cover in a camera of the second embodiment of the present invention.

The protective cover 60 is closed while the strobe 63 is pressed from above the camera body 59 against the constraining force of the torsion spring 66. The non-photography state shown in FIG. 20 is thus set.

As mentioned above, the camera of the second embodiment needs a smaller number of parts including switches than the camera of the first embodiment. Consequently, a camera having the same functions as the camera of the first embodiment can be provided easily with manufacturing cost minimized.

In the present invention, it will be apparent that a wide range of difference working modes can be formed on the basis of the invention without a departure from the spirit and scope of the invention. This invention is not restricted to any specific embodiment but limited by the appended claims.

What is claimed is:

1. A camera having a protective cover movable to slide between a position at which a photography lens is shielded and a position at which said photography lens is exposed, comprising:

a release member which is arranged at a position on said camera so that the release member is always exposed regardless of the position of said protective cover; and members of said camera used during photography that are shielded by said protective cover when said protective cover is located at a position at which said photography lens is protected, and that are exposed when said protective cover is located at the position at which said photography lens is exposed, said members being members that are used frequently during photography, wherein all of said members used during photography other than said release member are shielded by said protective cover when said protective cover is located at the position at which said photography lens is protected, and said protective cover lies within dimensions of an outer configuration of said camera body when said protective cover is located at the position at which said photography lens is protected as well as at the position at which said photography lens is exposed.

2. A camera according to claim 1, wherein said members include a manually maneuverable member for changing operating modes of said camera.

3. A camera according to claim 2, wherein said mode change manually maneuverable member is at least one of change members for changing photographic-state modes, changing strobe modes, and changing date modes.

4. A camera according to claim 1, wherein said members include a display member for displaying at least one of a photographic-state mode, strobe mode, and date mode of said camera.

5. A camera according to claim 1, comprising:

a removable housing member for said camera body, said protective cover becoming attachable or detachable when said housing member is removed.

6. A camera having a protective cover movable to slide between a position at which a photography lens is shielded and a position at which said photography lens is exposed, comprising:

a release member which is arranged at a position on said camera so that the release member is always exposed regardless of the position of said protective cover; and members of said camera used during photography being shielded by said protective cover when said protective cover is located at a position at which said photography lens is protected, and being exposed when said protective cover is located at the position at which said photography lens is exposed, said members being members that are used frequently during photography, wherein all of said members used during photography other than said release member are shielded by said protective cover when said protective cover is located at the position at which said photography lens is protected, and said protective cover lies within dimensions of an outer configuration of said camera body when said protective cover is located at the position at which said photography lens is protected as well as at the position at which said photography lens is exposed said members include a picture size change maneuverable member.

7. A camera according to claim 6, wherein said picture size change maneuverable member includes interlocked members for changing picture sizes responsive to movement of said protective cover.

8. A camera according to claim 7, wherein said protective cover includes a reset member for returning said picture size change maneuverable member to a reference picture size position when said protective cover is moved from the position at which said photography lens is exposed to the position at which said photography lens is shielded, and said interlocked members reset said picture size change maneuverable member to the reference picture size position along with movement of said protective cover to the position at which said photography lens is shielded.

9. A camera having a protective cover movable to slide between a position at which a photography lens is shielded and a position at which said photography lens is exposed, comprising:

members on said camera that are exposed by said protective cover when said protective cover is located at the position at which said photography lens is shielded, and that are shielded by the protective cover when said protective cover is covered at the position at which said photography lens is exposed, said members being members of which use during photography should be avoided and including at least one of an electrical rewind switch for starting rewinding of a film and a cover of a battery chamber for stowing a supply battery of said camera.

10. A camera according to claim 9, wherein said protective cover covers at least two sides of a camera body.

11. A camera according to claim 9, comprising:

a removable housing member for said camera body, said protective cover becoming attachable or detachable when said housing member is removed.

12. A camera, comprising:

a protective cover, movable to slide between a position at which a photography lens is shielded and a position at which said photography lens is exposed, for covering at least three sides of a camera body including a face and back thereof, a face portion of said protective cover shielding said photography lens, a back portion thereof shielding the back of said camera body at least by a height reaching an optical axis of said photography lens, and at least one sliding rail being provided on each of the three sides of said camera body to be covered by said protective cover wherein all of said members used during photography other than said release member are shielded by said protective cover when said protective cover is located at the position at which said photography lens is protected, and said protective cover lies within dimensions of an outer configuration of said camera body when said protective cover is located at the position at which said photography lens is protected as well as at the position at which said photography lens is exposed.

13. A camera according to claim 12, further comprising sliding rails provided at positions of said camera body opposed to parts of said protective cover to be pressed and rubbed when said protective cover is moved between the position at which said photography lens is shielded and the position at which said photography lens is exposed.

14. A camera according to claim 13, further comprising finger rests formed in areas of said protective cover to be pressed when said protective cover is moved between the position at which said photography lens is shielded and the position at which said photography lens is exposed.

15. A camera according to claim 12, further comprising:

a removable housing member for said camera body, said protective cover being capable of being attachable or detachable from the camera body when said removable housing member is removed from the camera body.

16. A camera according to claim 12, comprising:

a removable housing member for said camera body, said protective cover becoming attachable or detachable when said housing member is removed.

17. A camera having a protective cover movable to slide between a position at which a photography lens is shielded and a position at which said photography lens is exposed, comprising:

a strobe that is stowed in said camera body when said protective cover is located at the position at which said photography lens is shielded, and that juts out of said camera body responsively to the movement of said protective cover when said protective cover is located at the position at which said photography lens is exposed.

18. A camera according to claim 17, wherein when said protective cover is moved from the position at which said photography lens is exposed to the position at which said photography lens is shielded, said protective cover is blocked by said strobe from hitting a lens frame.

19. A camera according to claim 17, wherein said strobe is jutted due to at least one of a constraining force of an elastic member and a driving force of a motor.

20. A camera according to claim 17, wherein said protective cover shields at least two sides of said camera body.

21. A camera according to claim 17, comprising:

a removable housing member for said camera body, said protective cover becoming attachable or detachable when said housing member is removed.

22. A camera comprising a photography optical system, a lens cylinder that selectively advances and withdraws in a direction of an optical axis of the photography optical system, and a protective cover that extends into or recedes from an advancement/withdrawal path, said camera having an improvement in:

a flashgun for irradiating flashlight, said flashgun being movable between a stowed position at which said flashgun is stowed in said camera and a jutted position at which said flashgun juts out of said camera so as to irradiate flashlight, wherein, when said flashgun is located at the jutted position, if an attempt is made to extend said protective cover into the advancement/withdrawal path of said lens cylinder, said protective cover engages said flashgun so as to block movement of said protective cover.

23. A camera according to claim 22, wherein when said flashgun is placed so that when said flashgun is located at the stored position, movement of said protective cover will not be blocked.

24. A camera according to claim 22, wherein said flashgun is located within a trajectory along which said protective cover moves.

25. A camera according to claim 22, comprising:

a removable housing member for said camera body, said protective cover becoming attachable or detachable when said housing member is removed.

26. A camera comprising a photography optical system, a lens cylinder that advances or withdraws in a direction of an optical axis of the photography optical system, and a protective cover that advances into or recedes from an advancement/withdrawal path, said camera having improvements in:

a flashgun for irradiating flashlight, said flashgun lying within a trajectory along which said protective cover moves, and being movable to a stowed position at which said flashgun is stowed in said camera and a jutted position at which said flashgun juts out of said camera so as to irradiate flashlight;

a driving means for driving said lens cylinder so that said lens cylinder can advance or withdraw within the trajectory along which said protective cover moves, and driving said flashgun toward the jutted position and stowed position;

a sensing means for sensing that said protective cover has moved toward the lens cylinder advancement/withdrawal trajectory; and a drive control circuit for driving said driving means responsive to sensing by said sensing means, whereby said protective cover engages said flashgun before engaging said lens cylinder, and further movement of said protective cover is blocked; and after said flashgun is stowed at said stowed position, movement of said protective cover is enabled.

27. A camera according to claim 26, comprising:

a removable housing member for said camera body, said protective cover becoming attachable or detachable when said housing member is removed.

28. A camera having a protective cover movable to slide between a position at which a photography lens is shielded and a position at which said photography lens is exposed, comprising:

a jutting member for use during photography that is stowed in said camera body when said protective cover is located at the position at which said photography lens is shielded, and that juts out of said camera body responsive to movement of said protective cover when said protective cover is located at the position at which said photography lens is exposed, and wherein, when said protective cover is moved from the position at which said photography lens is exposed to the position at which said photography lens is shielded, said protective cover is blocked by said jutting member from engaging a lens frame.

29. A camera according to claim 28, wherein said jutting member is one of a strobe and at least part of a viewfinder optical system.

30. A camera according to claim 28, comprising:
a removable housing member for said camera body, said protective cover becoming attachable or detachable when said housing member is removed.

* * * * *

UNITED STATES PATENT AND TRADEMARK OFFICE
CERTIFICATE OF CORRECTION

PATENT NO. : 5,822,638
DATED : October 13, 1998
INVENTOR(S) : Yoshida et al.

It is certified that error appears in the above-identified patent and that said Letters Patent is hereby corrected as shown below:

Col. 7, line 67, delete "sizes" and insert --size--. PTO mistake

Col. 15, line 37, delete "but" and insert -- except as may be--.

Signed and Sealed this

Thirtieth Day of May, 2000

Attest:

Q. TODD DICKINSON

*Attesting Officer*         *Director of Patents and Trademarks*